(12) United States Patent
Miyahara et al.

(10) Patent No.: US 7,340,894 B2
(45) Date of Patent: Mar. 11, 2008

(54) UNITIZED SPRING DEVICE AND MASTER CYLINDER INCLUDING SUCH DEVICE

(75) Inventors: Minoru Miyahara, Higashi-Matsuyama (JP); Bernard Theil, Higashi-Matsuyama (JP)

(73) Assignee: Bosch Corporation, Tokyo (JP)

( * ) Notice: Subject to any disclaimer, the term of this patent is extended or adjusted under 35 U.S.C. 154(b) by 142 days.

(21) Appl. No.: 10/556,476

(22) PCT Filed: Jun. 21, 2004

(86) PCT No.: PCT/JP2004/008731

§ 371 (c)(1),
(2), (4) Date: Nov. 14, 2005

(87) PCT Pub. No.: WO2005/001306

PCT Pub. Date: Jan. 6, 2005

(65) Prior Publication Data

US 2006/0284355 A1    Dec. 21, 2006

(30) Foreign Application Priority Data

Jun. 26, 2003    (JP) ............................. 2003-183627

(51) Int. Cl.
*F16F 1/12* (2006.01)
*B60T 11/16* (2006.01)

(52) U.S. Cl. .......................................... 60/526; 92/128
(58) Field of Classification Search ................ 60/562; 92/128

See application file for complete search history.

(56) References Cited

U.S. PATENT DOCUMENTS

| | | | | |
|---|---|---|---|---|
| 4,474,005 A | * | 10/1984 | Steer | 60/562 |
| 4,559,781 A | * | 12/1985 | Steer et al. | 60/562 |
| 4,685,300 A | * | 8/1987 | Steer | 60/562 |
| 4,745,751 A | * | 5/1988 | Gaiser | 60/578 |
| 4,790,138 A | * | 12/1988 | Steer | 60/578 |
| 5,046,315 A | * | 9/1991 | Nakamura et al. | 60/562 |
| 5,063,743 A | * | 11/1991 | Mori et al. | 60/562 |
| 5,111,661 A | | 5/1992 | Savidan et al. | 60/562 |
| 5,142,965 A | * | 9/1992 | Zander | 60/562 |

(Continued)

FOREIGN PATENT DOCUMENTS

DE    299 14 985 U1    1/2001

(Continued)

*Primary Examiner*—Thomas E. Lazo
(74) *Attorney, Agent, or Firm*—Frommer Lawrence & Haug LLP; Ronald R. Santucci

(57) ABSTRACT

The invention is directed to improvements to the assembly of a unitized spring device. The spring device comprises a pair of retainer members which are tubular in shape and hollow inside. The retainer members have different outer circumference diameters which allow the second retainer member to fit onto the outer circumference of the first retainer member. The first retainer member has a first outward claw portion at one end and the second retainer member has a second inward claw portion at one end, such that the second claw portion can move beyond the first claw portion to couple the first and second retainer members in the axial direction. These first and second claw portions prevent one another from being pulled out in the coupled state. The first retainer member also comprises a slit which extends in the axial direction and divides at least the side having the first claw portion.

12 Claims, 3 Drawing Sheets

U.S. PATENT DOCUMENTS 6,519,940 B2 * 2/2003 Lange et al. .................. 60/562
6,591,736 B2 * 7/2003 Okada et al. ................. 60/562

FOREIGN PATENT DOCUMENTS

| | | |
|---|---|---|
| EP | 0 422 976 A1 | 4/1991 |
| GB | 1 458 838 | 12/1976 |
| JP | 3-49436 | 5/1991 |
| JP | 3-109164 | 5/1991 |
| JP | 03049436 U * | 5/1991 |
| JP | 5013666 | 4/1993 |
| JP | 653349 | 7/1994 |
| JP | 06053349 U * | 7/1994 |
| JP | 10-059161 | 3/1998 |
| JP | 11-247913 | 9/1999 |
| JP | 3035228 | 2/2000 |
| JP | 2001-180471 | 7/2001 |
| JP | 2001180471 A * | 7/2001 |
| JP | 2002-144660 | 5/2002 |
| JP | 2002-535200 | 10/2002 |
| WO | 00/44600 | 8/2000 |

* cited by examiner

UNITIZED SPRING DEVICE AND MASTER CYLINDER INCLUDING SUCH DEVICE

This application is a 371 of PCT/JP2004/008731 filed on Jun. 21, 2004, published on Jan. 6, 2005 under publication number WO 2005/001306 A1 which claims priority benefits from Japanese Patent Application Number 2003-183627 filed Jun. 26, 2003.

TECHNICAL FIELD

This invention relates to a unitized spring device that can be handled independently, more specifically, to a spring device advantageously applicable to a master cylinder for use in a vehicle's hydraulic braking system or the like.

BACKGROUND ART

For example, a master cylinder for a vehicle includes a cylinder main body having a cylinder bore, a piston that defines a hydraulic chamber in the cylinder bore of the cylinder main body, and a spring device that provides the piston with the force of the spring. The elements of the spring device are a retainer member that restricts the expansion/compression of the spring, and the spring supported by the retainer member.

In most spring devices, the piston itself serves as a direct spring bearing for the spring, and therefore the spring device itself is not formed as a unit and cannot be handled independently. Various examples of such conventional, non-unitized devices are disclosed by the following documents.

Patent Document 1: Japanese Patent No. 3035228 that discloses a spring device including a cup-shaped retainer, a screw member that has its one end coupled to the retainer and its other end supported by a piston, and a spring supported between the retainer and the piston (see FIG. 1 in particular).

Patent Document 2: U.S. Pat. No. 5,111,661 (that corresponds to Japanese Patent Laid-Open No. H03-109164) according to which an extended part of the piston plays the role of the spring member in the disclosure of Japanese Patent No. 3035228 described above (see the part denoted by reference numeral 42 in FIG. 1 in particular).

Patent Document 3: Japanese National Publication No. 2002-535200 (that corresponds to Intentional Publication WO 00/44600) that discloses a spring device having a retainer arrangement in which a sleeve-shaped retainer member is coupled with a pin-shaped retainer member in a transverse direction deviated from the axial line, and a piston (26) serves as a spring bearing for a spring (38) (see FIG. 1 in particular)

Meanwhile, there is a known unitized spring device including a pair of coupled retainer members whose axial length is extensible/contractible, and a spring supported by these retainer members, and these elements can be handled independently as a unit.

Patent Document 4: Japanese Utility Model Publication No. H05-13666 discloses a spring device that includes a cup-shaped retainer, a rod member having its one end coupled to the retainer and its other end having a spring bearing portion, and a spring supported between the spring bearing portion of the rod member and the retainer (see FIG. 3 in particular). The spring device formed as a unit that can be handled independently is more advantageous when it is assembled to the cylinder main body than those that are not formed as a unit.

DISCLOSURE OF THE INVENTION

Problems to be Solved by the Invention

The inventors had studied about spring devices that are formed as a unit. (The term "unit" may be replaced by "cartridge" or "package," while the term "unit" is the most appropriate when a plurality of elements are assembled and then the assembly can be handled independently.) Consequently, it was found that with respect to a unitized spring device, there were needs for further improvements for the assembly of the spring device itself, stable and smooth operation and reduction of disagreeable noise upon contacting. The conventional retainer or retainer member in particular is generally made of a metal and can cause annoying noise when metal parts contact each other.

It is therefore an object of the invention to provide a technique of further improving the assembly of a unitized spring device itself.

Another object of the invention is to provide a technique of making a unitized spring device operate smoothly and stably and reducing contacting noise as much as possible.

Other objects of this invention will become clear from the following description.

Means for Solving the Problems

According to the invention, a pair of retainer members supporting a spring is aligned in the axial direction, and pressing force acting in the axial direction is applied to the retainer members in order to assemble them. In this way, the elements of the spring device can be assembled by a single motion. The spring device based on the concept is principally characterized as follows.

(A) Each of the pair of retainer members is tubular in shape and hollow inside, and on the outer circumference of a first retainer member having a smaller diameter, a second retainer member having a larger diameter is fitted.

(B) The first retainer member has a first outward claw portion at one end, the second retainer member has a second inward claw portion at one end, the second claw portion can move beyond the first claw portion to couple the first and second retainer members in the axial direction, and these first and second claw portions function to prevent one another from being pulled out in the coupled state.

(C) The first retainer member includes a slit axially extending and dividing at least the side having the first claw portion.

The arrangement of the pair of retainer members fitted with one another in (A) is necessary for the axial length of these retainer member to be extended/shortened. In (A), not only the female-shaped, second retainer member but also the male-shaped, first retainer member is tubular in shape and hollow inside. This is advantageous in view of the readiness of coupling the retainer members as well as the reduction of the area occupied by the spring device (so that the volume of the hydraulic chamber in which the spring device is provided can be increased by the reduced volume). In view of the readiness, (A) in combination with (B) and (C) allows the first retainer member side having the smaller diameter to elastically deform, so that the first and second retainer members are coupled with each other.

It is clear from (B) that the retainer members both have a prescribed claw portion at one end. The first and second claw portions at the retainer members allow the retainer members to move in the direction to reduce the axial length of the retainer members, while after their coupling, the claw portions prevent each other from being pulled out and thus prevent the retainer members from being pulled out from each other in the axial direction. In this way, the claw portions restrict the maximum axial length of the coupled retainer members.

Furthermore, (C) is a condition necessary for the first retainer member having the smaller diameter and positioned on the inner circumferential side to elastically deform when the first and second retainer members are coupled. It is advantageous that at least the retainer member on the inner circumferential side is mainly elastically deformed because the retainer members can be coupled with each other substantially without elastically deforming the retainer member on the outer circumferential side. In this way, the second retainer member positioned close to the inner circumference of the spring can be prevented from inadvertently deforming and contacting the spring during the operation of the spring device.

The first and second claw portions in the first and second retainer members may have various raised shape sections such as a semi-circular shape and a V shape, and at least one of the first and second claw portions preferably has a wedge-shaped section. In this way, when the retainer members are pressed against each other in the axial direction in order to couple them, the wedge-shaped claw portion quickly deforms the more deformable retainer member on the inner circumferential side by the boosting effect of the wedge, so that the coupling can be achieved by a single motion. More preferably, the first and second claw portions may both have a wedge shape. Note that the claw portions may continuously be provided entirely in the circumferential direction. (The claw portions are "continuous" in the first retainer member except for the slits, because the first retainer member is divided by the slits in the first place.) The claw portions may be provided in a plurality of locations at intervals in the circumferential directions.

The first retainer member on the inner circumferential side may be devised or have a particular structure so that the first retainer member may more easily elastically deform. For example, it is advantageous that the thickness of the member on the side opposite to the side having the first claw portion is thinner, or a slit dividing the side having the first claw portion is extended to a position nearer to the spring bearing portion on the end than the central position of the first retainer member in the axial direction (for example to the vicinity of the base of the first retainer member).

Meanwhile, the second retainer member on the outer circumferential side may preferably have an outer diameter slightly larger on the side opposite to the side having the second claw portion. In this way, a spring can easily be assembled to the members, and when the spring extends/compresses, the spring and retainer members can be prevented from inadvertently contacting one another. When the pair of retainer members is extended/shortened in the axial direction, at least one of the first and second claw portions on the end can guide the circumferential wall of the corresponding retainer member.

The pair of retainer members is both preferably made of a resin material in order to reduce contacting noise as much as possible. In that case, in order to reinforce the strength of the resin, it is more preferred that reinforcement fiber such as glass fiber is mixed there into.

The spring device according to the invention may effectively be applied as an inner part for use in various master cylinders for vehicles. The device may be applied to master cylinders not only of a general tandem type but also of a single type. When the device is applied to the tandem type, it may be provided on the primary side and/or the secondary side. Application of the invention to a plunger type having a relief port or a conventional type particularly allows the master cylinder to be reduced in size, and the invention is also applicable to a center valve type.

DESCRIPTION OF REFERENCE CHARACTERS

Figure 1:
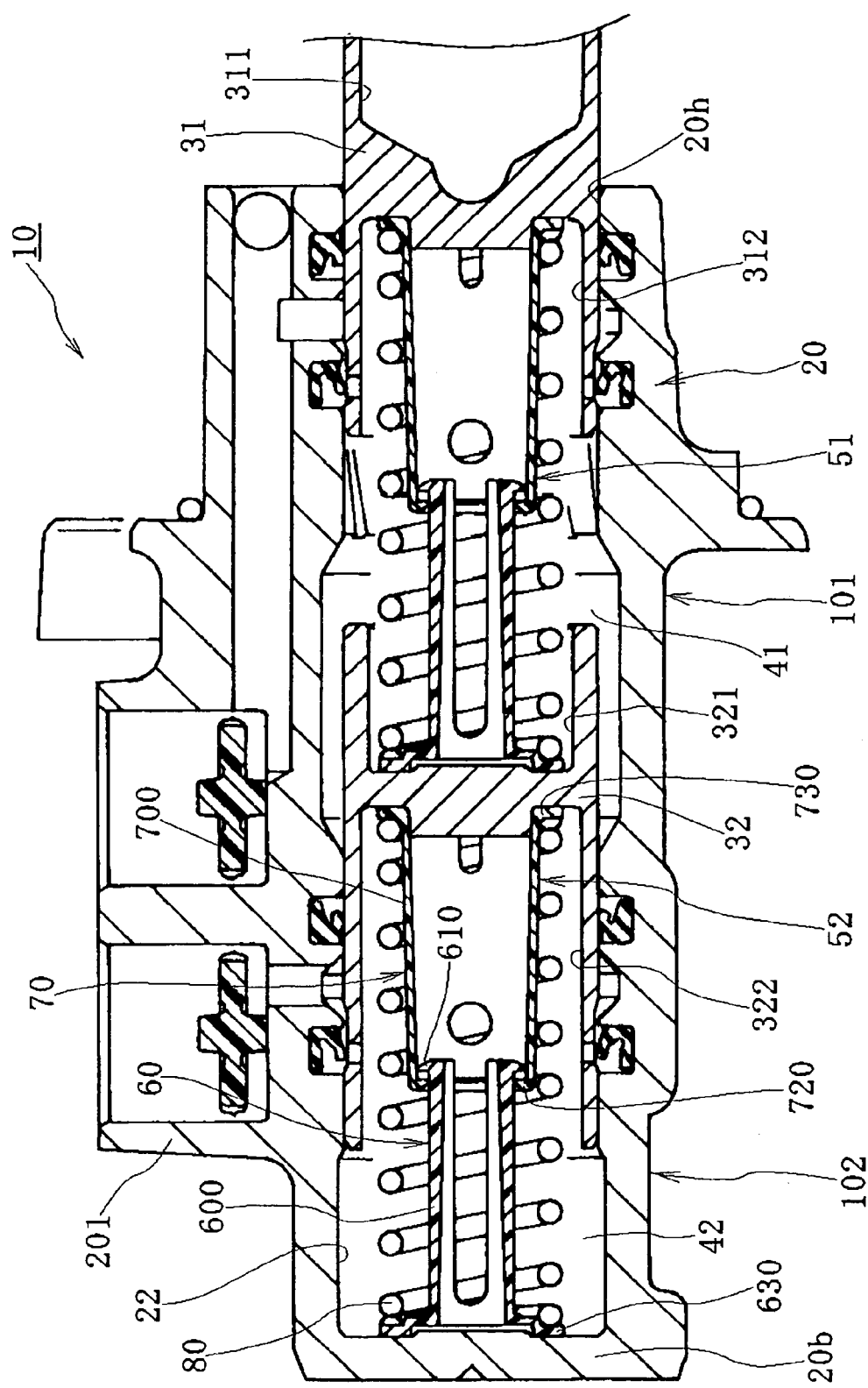
FIG. 1 is a sectional view of a tandem type master cylinder taken along the axial line, showing the master cylinder having a spring device according to the invention incorporated therein.

10 master cylinder
20 cylinder main body
22 cylinder bore
51, 52 spring device
60 first retainer member
70 second retainer member
80 spring
600, 700 tubular main body
602 slit
610 first claw portion
630, 730 spring bearing portion
720 second claw portion

BEST MODE FOR CARRYING OUT THE INVENTION

FIG. 1 shows a tandem type, plunger shaped master cylinder according to one embodiment of the invention. The tandem type master cylinder 10 includes a primary part 101 and a secondary part 102 independent from each other. In the shown embodiment, a spring device according to the invention is incorporated in each of the parts 101 and 102.

Referring to FIG. 1, the general structure of the tandem type master cylinder 10 will be disclosed. The outer part of the master cylinder 10 is a cylinder main body 20 made of an aluminum alloy. The cylinder main body 20 has a boss portion 201 that supports a reservoir (not shown) thereabove, and a cylinder bore 22 inside that axially extends from an open, first end 20h to a closed, second end 20b. The boss portion 201 supports the reservoir storing a hydraulic fluid therein and the nipple of the reservoir is fitted and connected to the inside of the portion.

A secondary piston 32 is inserted deeply inside the cylinder bore 22 of the cylinder main body 20, and a primary piston 31 is placed near the opening of the cylinder bore 22. The secondary and primary pistons 32 and 31 are aligned along the axial line of the cylinder bore 22. The primary piston 31 has a part inserted in the cylinder bore 22 and its remaining part extended outwardly from the opening of the cylinder bore 22. The extended part comes inside a booster that is not shown and is connected with the booster. As is well known, the booster boosts the force applied to a brake pedal, and applies the boosted force to the master cylinder 10 (to the primary piston 31 of the master cylinder 10, to be exact).

The secondary and primary pistons 32 and 31 have recesses 321 and 322, and 311 and 312, respectively on both sides in the axial direction. The recess 322 of the secondary piston 32 on the side of the second end 20*b* serves as a space to receive a part of the spring device 52 on the secondary side, and the recess 321 on the side of the first end 20*h* on the opposite side serves as a space to receive a part of the spring device 51 on the primary side. The recess 312 on the side of the second end 20*b* of the primary piston 31 similarly serves as a space to receive a part of the spring device 51 on the primary side, while the recess 311 on the side of the first end 20*h* of the primary piston 31 serves as a space to receive the output rod (not shown) of a booster separate from the spring device.

In this way, in the cylinder bore 22 of the cylinder main body 20, there are the spring device 52 on the secondary side, the secondary piston 32, the spring device 51 on the primary side, and the primary piston 31 arranged in alignment in this order in the axial direction from the inside of the bore toward the opening. The two chambers defined by the pistons 32 and 31, in other words, the part 42 having the spring device 52 and the part 41 having the spring device 51 both serve as hydraulic chambers. Herein, the spring devices 52 and 51 on the secondary and primary sides have substantially the same structure although the spring force is smaller on the secondary side than on the primary side. Therefore, the elements of the spring devices 52 and 51 will be denoted by the same reference characters in the following description.

Figure 2:
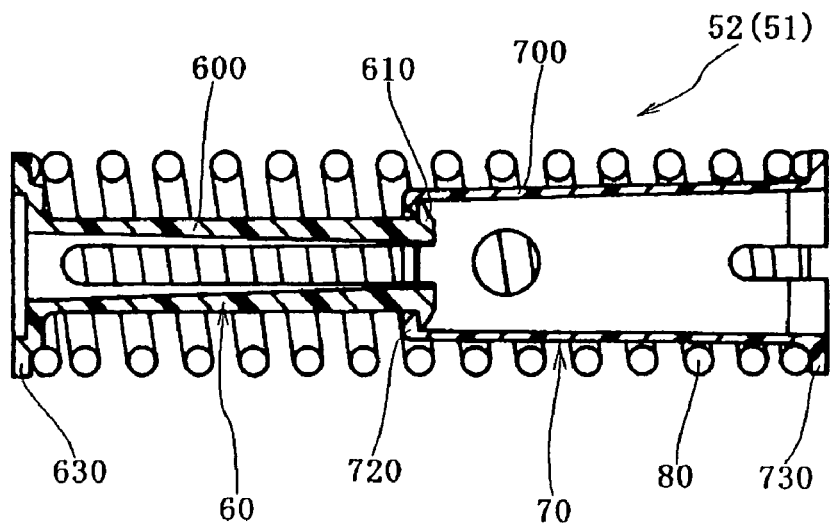
FIG. 2 is a view of the spring device according to the invention before the device is incorporated in the master cylinder.

FIG. 1 shows how the spring device 52 (51) is incorporated inside the cylinder bore 22 of the cylinder main body 20, and FIG. 2 shows the spring device 52 (51) before it is incorporated inside. The spring device 52 (51) includes a pair of resin-molded retainer members 60 and 70 and a spring (compression coil spring) 80 supported by the retainer members. The retainer members 60 and 70 are both tubular in shape and hollow inside and the retainer member (second retainer member) 70 having the larger diameter is fitted on the outer circumference of the retainer member (first retainer member) 60 having the smaller diameter. Therefore, the first retainer member 60 as a male member and the second retainer member 70 as a female member are coupled with each other.

The tubular, first and second retainer members 60 and 70 have claw portions 610 and 720 at the ends of the tubular main bodies 600 and 700 on one side, and spring bearing portions 630 and 730 on the ends opposite to the claw portions 610 and 720. The spring bearing portions 630 and 730 both have an outward flange shape in order to support the ends of the spring 80. Meanwhile, the claw portion 610 of the first retainer member 60 is radially outwardly shaped but the claw portion 720 of the second retainer member 70 is radially inwardly shaped since the first and second retainer members 60 and 70 serve as the male and female members, respectively. The first and second claw portions 610 and 720 prevent one anther from being pulled out and restrict the maximum length of the spring 80.

As shown in FIG. 2, when the spring device 52 (51) is outside the cylinder bore 22 of the cylinder main body 20 (in other words, before it is incorporated into the cylinder bore 22), the first and second claw portions 610 and 720 abut against each other by the force of the spring 80 supported between the spring bearing portions 630 and 730. In this way, the spring device 52 (51) can be handled independently as a single unit. In the spring device 52 (51) before it is incorporated, the claw portions 610 and 720 abut against each other, and therefore the force of the spring 80 is applied to the retainer members 60 and 70 through the claw portions 610 and 720. Therefore, the materials of the retainer members 60 and 70 must have enough strength for the state. In this viewpoint, the materials of the retainers 60 and 70 may preferably include fiber-reinforced resin such as polyamide resin containing 30% glass fiber (trade name: Nylon 66). In the spring device 52 (51) after it is incorporated as shown in FIG. 1, however, pre-load is applied to the spring 80, so that the first and second claw portions 610 and 720 are separated from each other in the axial direction. Therefore, the force of the spring 80 is applied only to the spring bearing portions 630 and 730, not to the tubular main bodies 600 and 700 of the retainer members 60 and 70. Consequently, the materials of the retainer members 60 and 70 do not need strength more than necessary.

Figure 3:
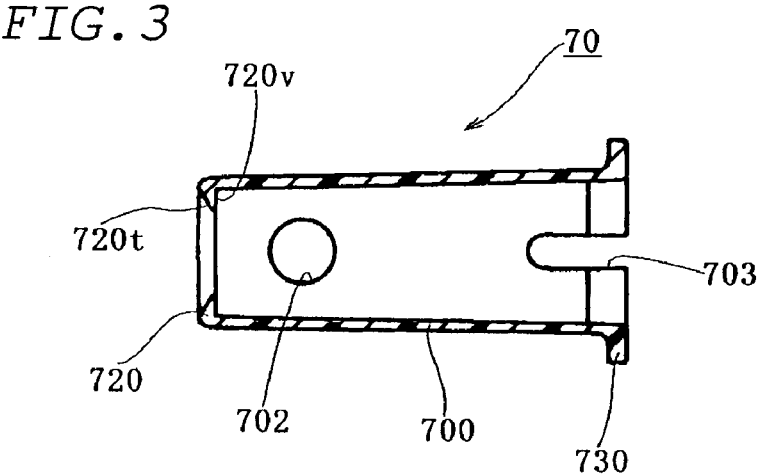
FIG. 3 is a sectional view of a second retainer member seen from the front.
Figure 4:
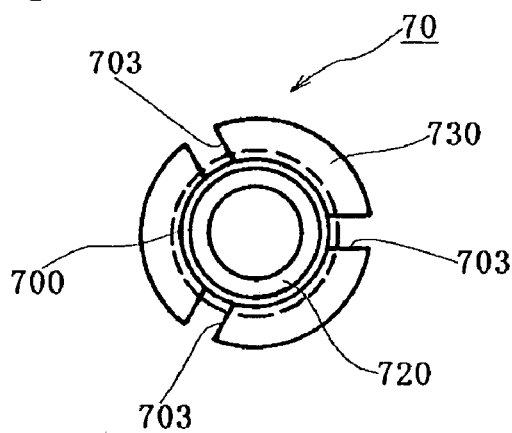
FIG. 4 is a side view of the second retainer member in FIG. 3 seen from the right in the sheet.

FIG. 3 is a sectional view of the female shaped, second retainer member 70 seen from the front, and FIG. 4 is a side view of the second retainer member 70 in FIG. 3 seen from the right in the sheet. The main body 700 of the second retainer member 70 has its axial ends opened, and a round hole 702 and an elongate hole 703 provided at the main body 700 penetrate between the inner side and the outer side of the main body 700. Two such round holes 702 are provided near the second claw portion 720 in the circumferential direction. As can be seen from FIG. 4, three such elongate holes 703 on the side of the spring bearing portion 730 are provided in the circumferential direction. The main body 700 has a slightly thicker part on the side of the second claw portion 720, but the thickness difference between the part and the side having the spring bearing portion 730 is insignificant. Therefore, the main body 700 can be considered to have a substantially equal thickness (for example in the range from 0.5 mm to 0.65 mm) generally in the axial direction. Now, the shape of the second claw portion 720 at one end of the main body 700 should be noted. The second claw portion 720 has a height of a little more than 1 mm and has a wedge shape (or V-shape) in a section. The face 720*v* on one side of the second claw portion 720 having the wedge shaped section is orthogonal to the axial line of the main body 700, and the face 720*t* on the other side is inclined by 30° to 40° with respect to the face 720*v*.

Figure 5:
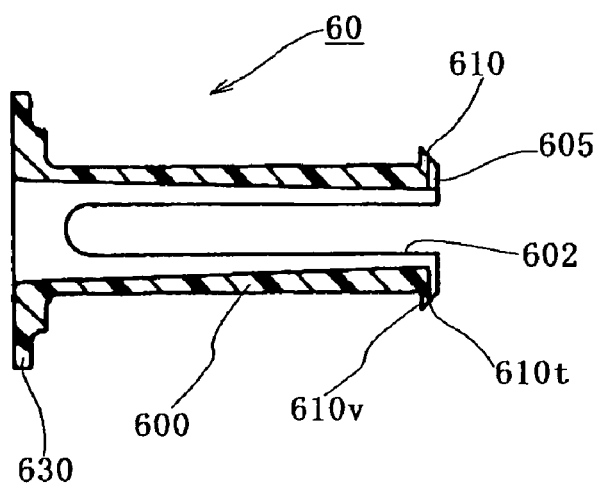
FIG. 5 is a sectional view of a first retainer member seen from the front.
Figure 6:
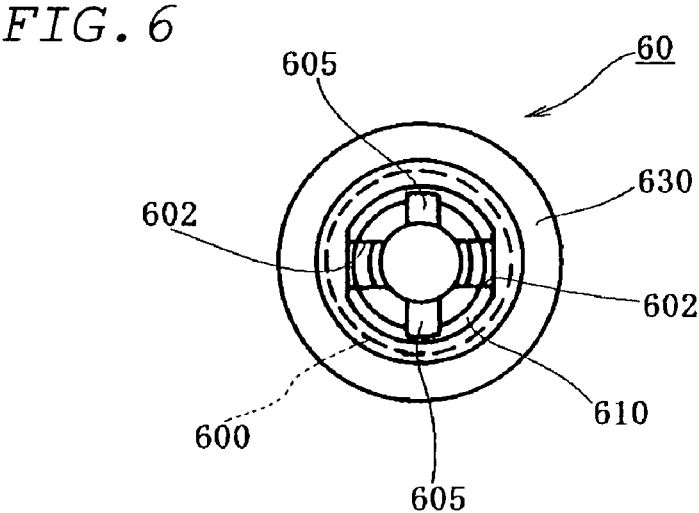
FIG. 6 is a side view of the first retainer member in FIG. 5 seen from the right in the sheet.

FIG. 5 is a sectional view of the male-shaped, first retainer member 60 seen from the front, and FIG. 6 is a side view of the first retainer member 60 in FIG. 5 seen from the right in the sheet. The main body 600 of the first retainer member 60 has its axial ends both opened. The outer diameter of the main body 600 is smaller than that of the main body 700 of the second retainer member 70, so that the main body 600 is fitted in the inner circumference of the main body 700 with allowance. The main body 600 of the first retainer member 60 has a slit 602 extending from the side having the first claw portion 610 to the vicinity of the base on the side having the spring bearing portion 630. As shown in FIG. 6, such slits 602 are provided in two locations 180° apart in the circumferential direction. The main body 600 of the first retainer member 60 has a thickness generally larger than that of the main body 700 of the second retainer member 70, and the side having the first claw portion 610 is thicker than the side having the spring bearing portion 630. The first claw portion 610 on one end of the main body 600 of the first retainer member 60 is formed outwardly, but has the same height and shape as those of the second claw portion 720. More specifically, the first claw portion 610 has a height slightly larger than 1 mm, and a wedge-shaped (V-shaped)

section. The wedge-shaped, one face 610v of the first claw portion 610 is orthogonal to the axial line of the main body 600 and the other face 610t is inclined by about 30° to 40° with respect to the face 610v. Note that a recess 605 that is 90° apart from the slit 602 in the circumferential direction serves as a gate for resin molding.

Now, referring to FIG. 6, the shape of the part having the first claw portion 610 of the main body 600 will be described. When an end of the main body 600 is viewed in the axial direction, the two slits 602 are aligned and the outer diameters of the first retainer member 60 in the locations of these slits are smaller than the outer diameter of the other part without the slits 602. The outer circumferential part of the end is partly cut in order to reduce the outer diameter for the following reason. When the male-shaped, first retainer member 60 and the female-shaped, second retainer member 70 are assembled, the first claw portion 610 and the second claw portion 720 of these members are arranged to oppose each other, and the retainer members 60 and 70 are provided with force in the axial direction. In this way, the force transmitted through the claw portions 610 and 720 causes the main body 600 of the first retainer member 60 (that is easily deformable because of the slit 602) to elastically deform to narrow the opening side of the slit 602. The deformation tends to increase the outer diameter of the end of the main body 600 on the side facing the opening of the slit 602. For example, if the main body 600 is in the circular shape without being partly cut in the end, the circle could deform into an ellipse, which can prevent the first claw portion 610 from being smoothly fitted in the inner circumference of the second claw portion 720. The outer circumferential part of the end of the main body 600 is partly cut in order to eliminate the possibility. When the first and second retainer members 60 and 70 are assembled, one of the retainer members (normally the second retainer member 70 having the larger outer diameter) is provided with the spring 80, and the force in the axial direction as described above is applied, so that these retainer member 60 and 70 may be coupled to be assembled by a single motion. This is because the effect of the wedge shape of the first and second claw portions 610 and 720 allows the main body 600 of the easily deformable first retainer member 60 to be readily deformed. Once the assembling is over, the first and second claw portions 610 and 720 can prevent one another from being pulled out, so that the spring device 51 (52) can maintain its form as a unit as shown in FIG. 2.

As an inner part of the master cylinder 10, the spring device 51 (52) smoothly and quietly extends and compresses the spring 80 as the first claw portion 610 or/and the second claw portion 720 guide the corresponding one of the circumferential walls of the main bodies 700 and 600 of the retainer members 70 and 60 during the operation of the master cylinder 10. In this respect, since the retainer members 60 and 70 are made of a resin material, the sound caused by contacting is small and not annoying. Since the two retainer members 60 and 70 are made of the same resin material, troubles caused by changes in the size of the retainer members 60 and 70 according to the temperature and humidity changes can be prevented.

The invention claimed is:

1. A spring device comprising a pair of retainer members coupled so that their axial length can be increased/reduced and a spring supported by these retainer members, said elements being formed into a unit that can be handled independently, wherein (A) each of said pair of retainer members is tubular in shape and hollow inside, and on the outer circumference of a first retainer member having a smaller diameter, a second retainer member having a larger diameter is fitted;

(B) said first retainer member has a first outward claw portion at one end, said second retainer member has a second inward claw portion at one end, the second claw portion can move beyond the first claw portion to couple the first and second retainer members in the axial direction, and these first and second claw portions function to prevent one another from being pulled out in the coupled state; and (C) said first retainer member includes plural slits axially extending and dividing at least the side having said first claw portion, and thereby said first retainer member on the inner circumferential side is elastically deformed when said first and second retainer members are pressed against each other in the axial direction in order to couple them.

2. The spring device according to claim 1, wherein at least one of said first and second claw portions has a wedge-shaped section.

3. The spring device according to claim 1, wherein said first retainer member is thinner on the side opposite to the side having said first claw portion.

4. The spring device according to claim 1, wherein said second retainer member has an outer diameter that is larger on the side opposite to the side having said second claw portion.

5. The spring device according to claim 1, wherein when said pair of retainer members extends/compresses in the axial direction, at least one of said first and second claw portions guides the circumferential wall of the corresponding one of the retainer members.

6. The spring device according to claim 1, wherein said first and second retainer members both comprise a spring bearing portion to support an end of said spring on the side opposite to the side having the claw portion.

7. The spring device according to claim 6, wherein the slit in said first retainer member has one end that divides the side having said first claw portion and the other end that is positioned closer to said spring bearing portion than the central position of the first retainer member in the axial direction.

8. The spring device according to claim 1, wherein when the side of said first retainer member having said first claw portion is viewed in the axial direction, two said slits are aligned in the radial direction, and the outer diameter of the first retainer member in the locations of the slits is smaller than the outer diameter of the other part without said slits.

9. The spring device according to claim 1, wherein said first and second retainer members are both made of a resin material.

10. A master cylinder comprising a cylinder main body having a cylinder bore, a piston that defines a hydraulic chamber in the cylinder bore of cylinder the main body, and a spring device providing the piston with spring force, said spring device comprising a pair of retainer members coupled to one another so that the axial length of the members can be increased/reduced, and a spring supported by these retainer members, said spring device being formed as a unit that can be handled independently, wherein said spring device is further characterized in that (A) each of said pair of retainer members is tubular in shape and hollow inside, and on the outer circumference of a first retainer member having a smaller diameter, a second retainer member having a larger diameter is fitted;

(B) said first retainer member has a first outward claw portion at one end, said second retainer member has a second inward claw portion at one end, the second claw portion can move beyond the first claw portion to couple the first and second retainer members in the axial direction, and these first and second claw portions function to prevent one another from being pulled out in the coupled state; and (C) said first retainer member includes plural slits axially extending and dividing at least the side having said first claw portion, and thereby said first retainer member on the inner circumferential side is elastically deformed when said first and second retainer members are pressed against each other in the axial direction in order to couple them.

11. The master cylinder according to claim 10, wherein at least one of said first and second claw portions has a wedge-shaped section.

12. The master cylinder according to claim 10, wherein said first and second retainer members are both made of a resin material.

* * * * *